G. E. FISHER.
PINEAPPLE MEAT ERADICATOR.
APPLICATION FILED APR. 6, 1918.

1,350,096.

Patented Aug. 17, 1920.
4 SHEETS—SHEET 1.

Inventor
George E. Fisher,

Attorneys

G. E. FISHER.
PINEAPPLE MEAT ERADICATOR.
APPLICATION FILED APR. 6, 1918.

1,350,096.

Patented Aug. 17, 1920.
4 SHEETS—SHEET 3.

G. E. FISHER.
PINEAPPLE MEAT ERADICATOR.
APPLICATION FILED APR. 6, 1918.
1,350,096.
Patented Aug. 17, 1920.
4 SHEETS—SHEET 4.
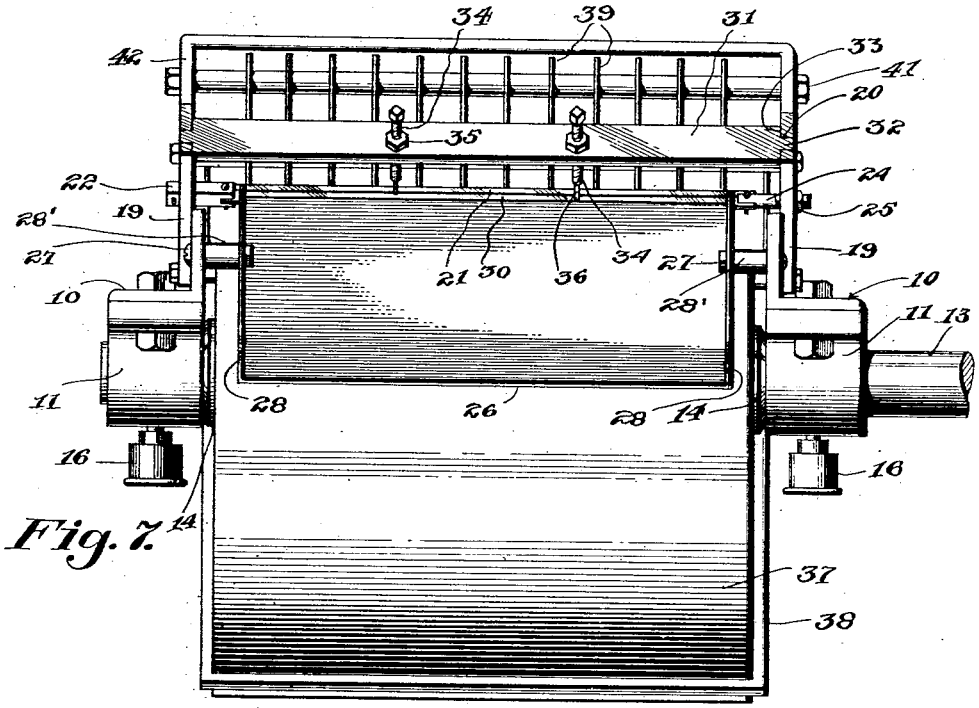
Fig. 7.
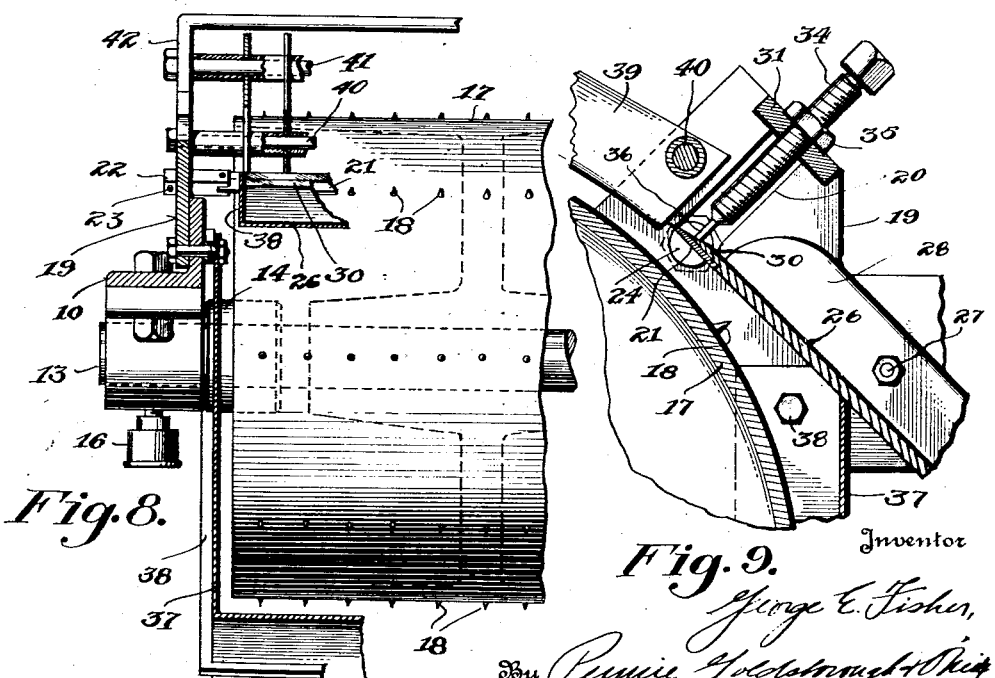
Fig. 8.
Fig. 9.
Inventor
George E. Fisher,
By Pennie, Goldsborough & Ship
Attorney

UNITED STATES PATENT OFFICE.

GEORGE EDWIN FISHER, OF HONOLULU, TERRITORY OF HAWAII.

PINEAPPLE-MEAT ERADICATOR.

1,350,096.　　　　　Specification of Letters Patent.　　Patented Aug. 17, 1920.

Application filed April 6, 1918. Serial No. 227,007.

*To all whom it may concern:*

Be it known that I, GEORGE EDWIN FISHER, a citizen of the United States, residing in the city and county of Honolulu, in the Territory of Hawaii, have invented certain new and useful Improvements in Pineapple-Meat Eradicators; and I do hereby declare the following to be a full, clear, and exact description of the invention, such as will enable others skilled in the art to which it appertains to make and use the same.

This invention relates to a pineapple meat eradicator.

In preparing pineapples for the market it is customary to cut the top and bottom portions therefrom, after which a cylinder of the pineapple meat is cut therefrom, from which cylinder the core is properly removed. This cylinder is a marketable product and is usually cut into slices in the well known manner. After the removal of the cylinder of pineapple meat from the shell, a considerable amount of meat is left on the shell, since the latter is not cylindrical in form and the amount of meat varies in thickness from edge to edge of the shell. It has been the custom to split this shell and flatten the same so as to facilitate the removal of this meat. This removal has been accomplished in various ways in the past, but because of the difficulties encountered, it has usually resulted in the production of an inferior and somewhat dirty product.

It is the primary object of this invention to produce a machine for slicing the meat from the pineapple shell, after the cylinder has been removed, in such manner that a marketable product will be produced, which product is not of the usual inferior grade and is freer from dirt, eyes and the like. This result is accomplished by removing the meat from the shell while the shell is in such position that the meat side is uppermost.

It is a further object of this invention to provide a machine which will be substantial and which will not be affected by the action of the pineapple juices, so as to be rendered inoperative after a period of use.

With these and other objects in view, such as will appear as my description progresses, my invention comprises the combination and arrangement of parts as set forth in and falling within the scope of the appending claims.

In the drawing:

Fig. 2 is a top plan view of the machine with the upper guard removed and the front guard broken away;

Fig. 3 is a vertical longitudinal sectional view;

Fig. 7 is an end elevation of the machine looking at the meat discharge chute;

Fig. 8 is a fragmental section of one side of the machine, and

Fig. 9 is a fragmental section illustrating the relative positions of the knife and flattening vanes.

Figures 1, 4:
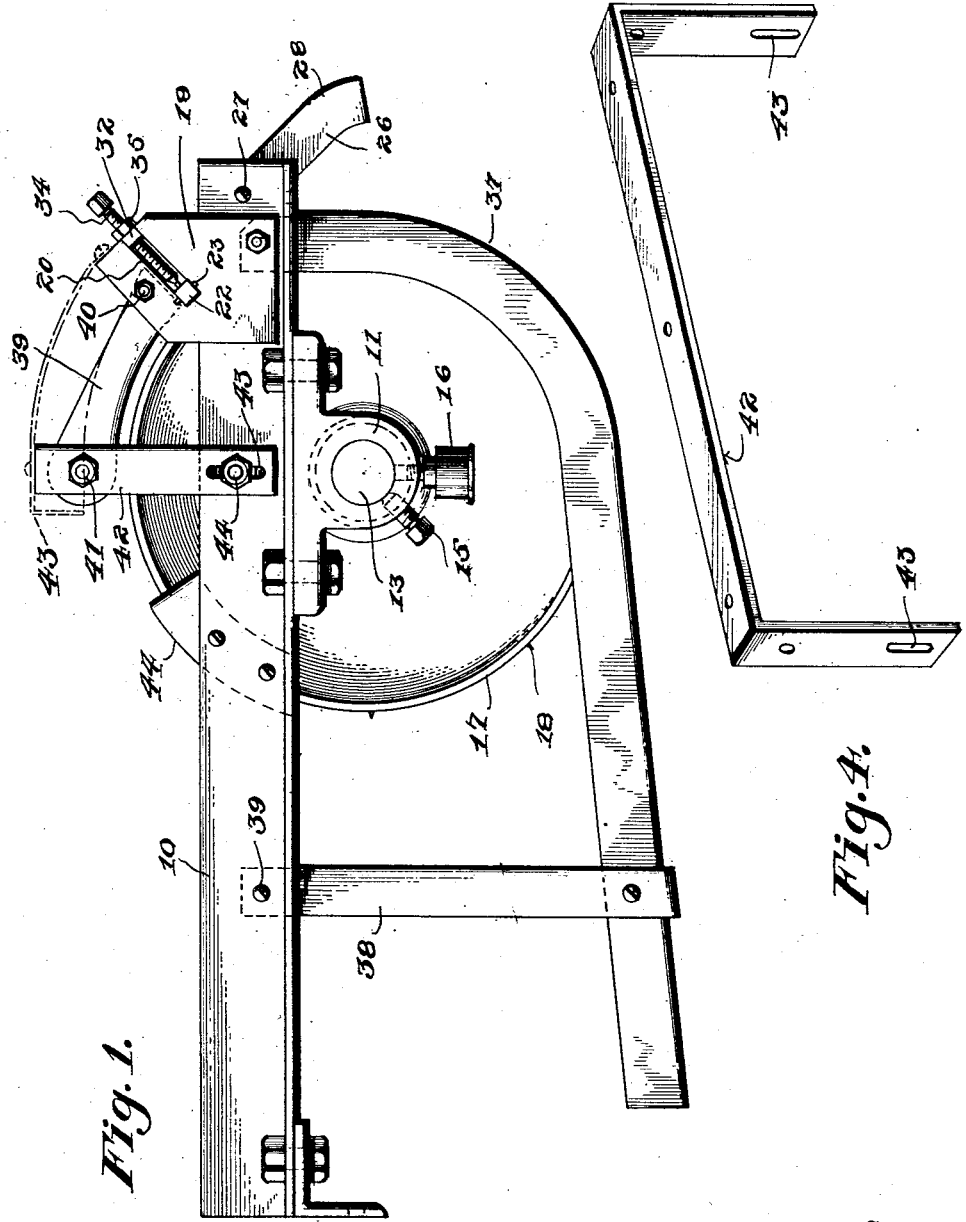
Figure 1 is a side elevation of the machine, showing the upper guard in construction lines in order that the position of the contiguous parts may be more clearly disclosed.
Fig. 4 is a perspective view of the support for the upper guard and for the flattening vanes.
Figure 5:
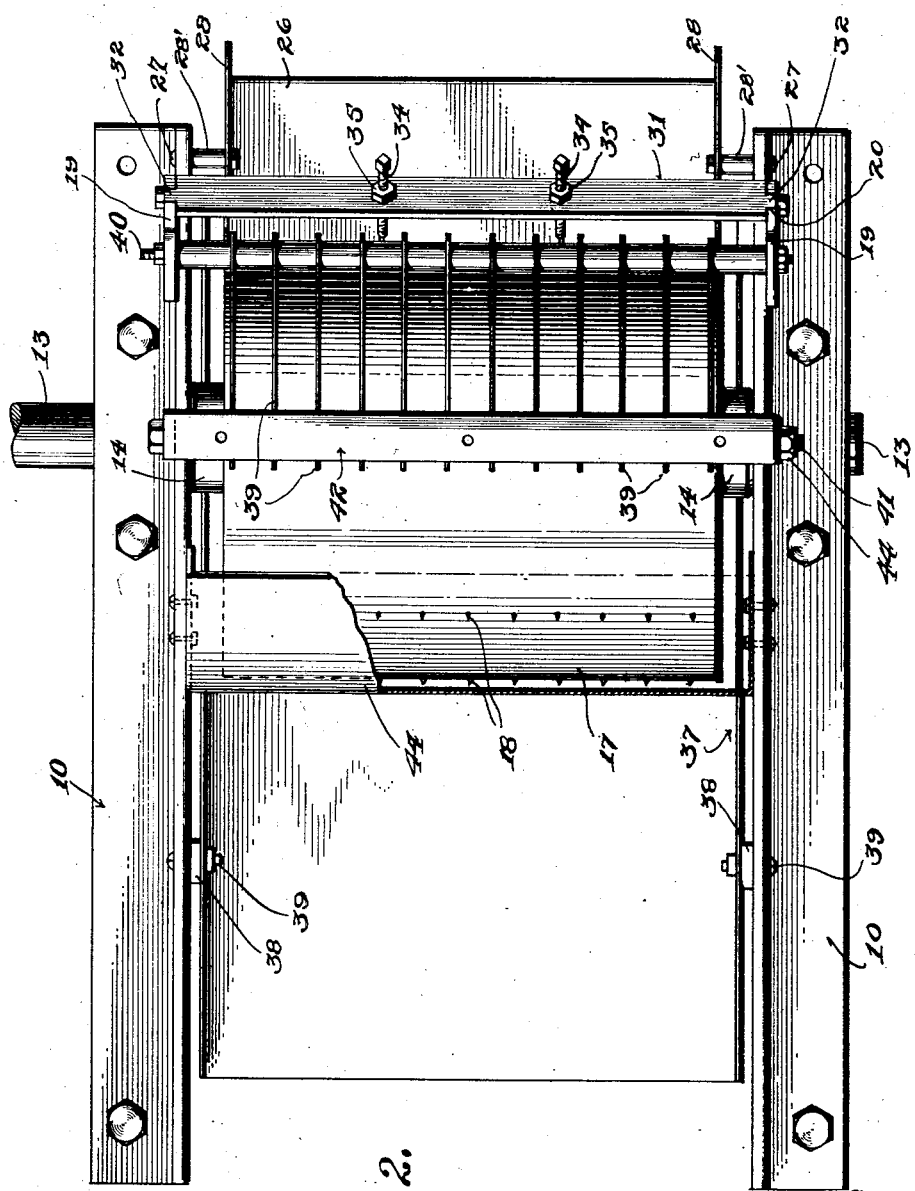
Fig. 5 is a perspective view of the meat discharge chute.
Figure 6:
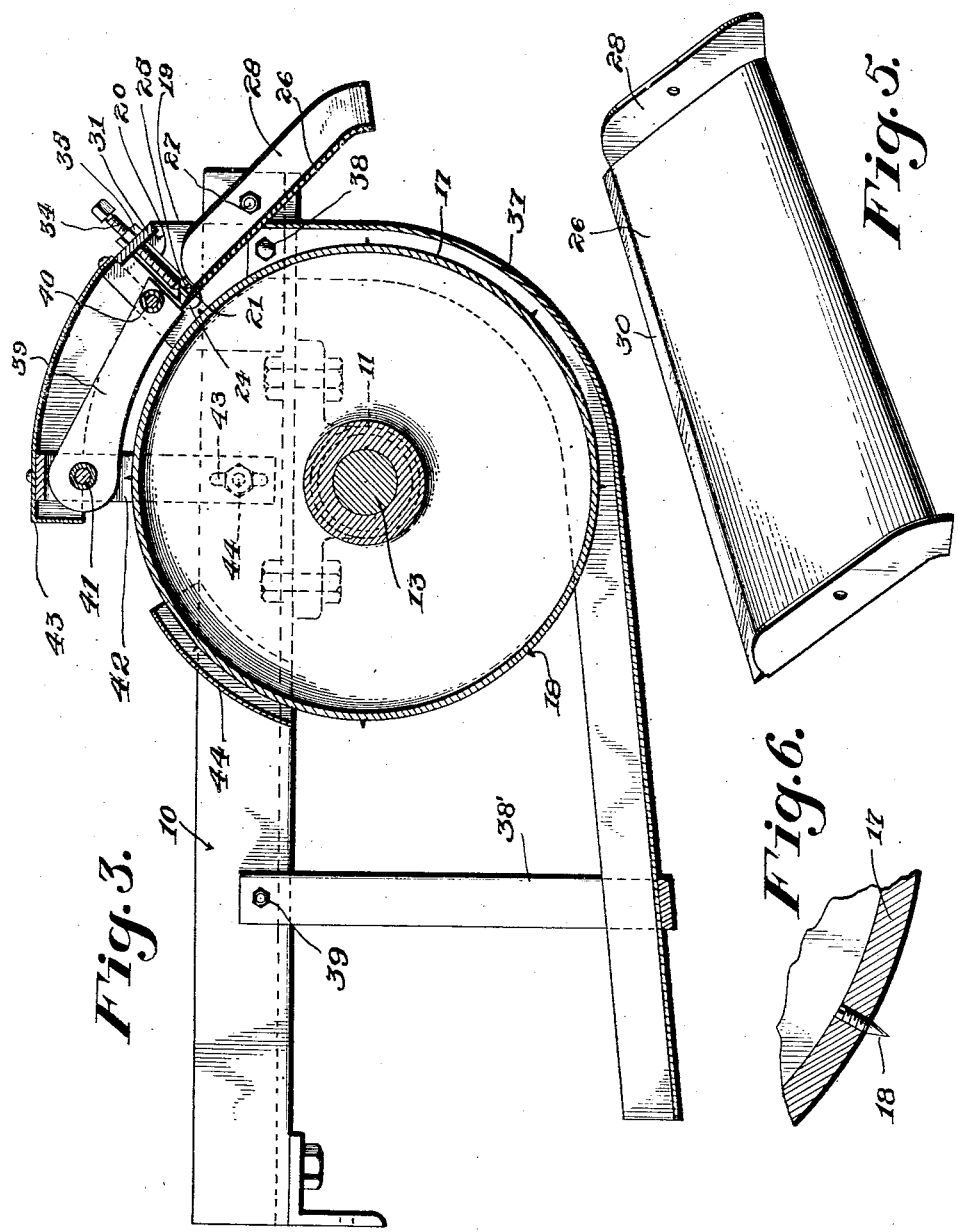
Fig. 6 is a fragmental section of a portion of the feed drum.

The embodiment of the invention illustrated in the drawings includes a frame which consists of a pair of side bars 10, which bars are suitably supported and carry depending bearings 11. These bearings are secured by suitable attaching means to the side bars and support the shaft 13. This shaft 13 is prevented from having longitudinal movement by suitable collars 14 which are attached to the shaft by set screws 15 and the portions of the shaft in the bearings are lubricated by means of grease cups 16. A feed drum 17 of such material as will be unaffected by the action of the pineapple juice is secured to the shaft 13 and rotates with the same, the motion being transmitted to the shaft by any suitable means. This feed drum is provided on its peripheral face with a plurality of spurs 18, which are for the purpose of penetrating the pineapple shells in order to facilitate the passage of the shells with the drum.

Extending upwardly from the side bars 10 at the rear of the feed drum is a pair of plates 19, each of which plates being provided with an inclined slot 20, which is closed at its lower end, but opens through the upper edge of the plate. A knife 21 is provided, which knife has on one end an angular block 22, the block being arranged and slidable within the slot 20 in one of the plates 19 and of such shape as to prevent the rotation of the knife. Extending through the projecting end of this block 22 is a pin 23, which is adapted to engage the outer face of the plate 19. To the opposite end of the knife a bolt 24 is attached, which extends through the adjacent slot 20 and is provided with a nut 25, which upon being tightened draws the pin 23 tightly into engagement with the outer face of the opposite plate 19 and thus holds the knife taut. This knife is arranged, as illustrated in the drawing, parallel to the axis of the drum 17, and in slight spaced relation to the peripheral face of said drum, so that as the pineapple shells are fed by the drum, the meat will be cut therefrom. A meat discharge chute 26 is attached to and extends between the side bars 10, the attachment being made by means of bolts 27, on which are mounted spacing sleeves 28', the latter being necessary because of the fact that the chute does not extend completely from one of the side bars to the other, but terminates short thereof. The upper edge of the chute which extends beyond the side flanges 28, is beveled at 30, as clearly illustrated in Fig. 9, and rests upon the upper surface of the knife 21, the bevel 30 forming in effect a continuation of the bevel of the knife. Extending transversely of the machine above and in spaced relation to the knife 21 is a supporting bar 31, which bar is provided with reduced portions 32, which portions result in the provision of shoulders 33. The reduced portions 32 extend into the slots 20 and the shoulders 33 engage the inner faces of the plates 19. This bar is secured to the side plates in this relation and, therefore, supports the same and prevents their lateral movement. Knife adjusting bolts 34 extend through and are in threaded engagement with the bar 31, which bolts are provided with lock nuts 35 and at their lower ends have reduced fingers 36, which bear upon the beveled portion 30 of the discharge chute 26. The function of these bolts is to hold the knife in position and to maintain the upper end of the chute in contact with the upper surface of the knife.

A shell discharge chute 37 is attached at 38 to the side bars 10 of the frame and extends downwardly from a point beneath the meat discharge chute 26 and toward the front of the machine, the extended portion of the chute 37 being supported at its forward end by a bracket 38', which is secured at 39 to the side bars and depends therefrom. The curvature of this chute 37 practically follows that of the drum 17 to the lower portion of the drum, so that the pineapple shells are maintained on the drum during their passage through the curved portion of the chute, and thus are positively discharged. Naturally this positive feeding of the shells prevents any clogging of the chute.

In order that the pineapple shells may be fed in a flattened condition to the knife 21 with the meat sides uppermost. I have provided a plurality of spaced relatively thin vanes 39. These vanes are arranged in a series which extends transversely of the machine and longitudinally of the drum, being supported at their rear ends by a bolt 40, which extends from one of the plates 19 to the other, and being supported at their forward ends by a bolt 41, which is attached to a suitable bracket 42. This bracket 42 is provided with slots 43 in its legs, through which slots bolts 44 extend for attaching the bracket adjustably to the side bars 10. Because of this adjustment the relation of the drum 17 and the flattening vanes 39 may be varied. The lower edges of these vanes 39 are curved, following the curvature of the drum 17 and the vanes terminate immediately in advance of the knife 21, the lower edges of the vanes, preferably being below the cutting edge of the knife, as illustrated in Fig. 9.

A guard 43 is mounted above the vanes 39 on the bracket 42 and on the plates 19, while a second guard 44 is mounted in advance of the feeding drum 17, so as to protect the operator during the feeding of the shells to the drum.

In operation the drum is rotated by any suitable mechanism and the pineapple shells are fed to the drum between the upper edge of the guard 44 and the forward end of the vanes 39 with the meat sides uppermost. The shells are fed by the drum because of the fact that the spurs 18 penetrate the shells and thus cause their movement. The shells pass beneath the flattening vanes 39, and these vanes effectively flatten the shells against the peripheral face of the drum 17, so that the shells are flat when they meet the knife. As the shells are fed in this flattened condition by the drum 17, the knife 21 cuts the meat from the shells substantially in strips, since the meat is cut in the opposite direction by the vanes 39. These strips of meat pass over the knife into the discharge chute 26, while the shells are carried downwardly into the shell discharge chute 37 and to a convenient point of discharge. It will be seen that the meat is in effect lifted from the shells and that the shells are carried downwardly away from the meat and, inasmuch as the meat and shells are discharged from different chutes, the meat will be in a very desirable condition; that is to say, it will not be mixed with quantities of dirt or eyes. Furthermore, the removal of the meat from the shells in the form of strips makes a particularly desirable marketable product, and consequently greatly enhances the value of the machine. It will be seen that the nature of the machine is such that it will not easily become inoperative, and that the parts will not be affected by the action of the pineapple juice.

What I claim is:—

1. In a machine of the class described, the combination with a rotary drum, of a plurality of vanes arranged adjacent to the peripheral face of the drum and extending transversely to the axis thereof, said vanes being relatively thin and adapted to penetrate the meat of a pineapple and flatten the shell against the drum, and a knife arranged adjacent to the peripheral face of the drum and to the rear of the vanes for cutting and lifting the pineapple meat from the flattened shells.

2. In a machine of the class described, the combination with a rotary drum, of means for flattening pineapple shells against the drum by pressure on the inner face of the shells causing an initial separation of the meat from the shell and a knife arranged to the rear of said means to cut and further lift the pineapple meat from the shells.

3. In a machine of the class described, the combination with a rotary drum, of a plurality of vanes for flattening pineapple shells against the face of the drum, a knife arranged to the rear of said vanes, and means for adjusting the distance of the knife from the face of the drum independently of the vanes.

4. In a machine of the class described, the combination with a rotary drum, means for flattening pineapple shells against the drum, said means being operable on the meat side of the shells, a knife arranged to the rear of said means and adjacent to the peripheral face of the drum, said knife being adapted to cut and lift the pineapple meat from the shells and said drum being adapted to thereafter carry the shells downward away from the knife.

In testimony whereof I affix my signature.

GEORGE EDWIN FISHER.